United States Patent
Kloos

(10) Patent No.: US 11,958,450 B2
(45) Date of Patent: Apr. 16, 2024

(54) COMPRESSED-AIR BRAKING SYSTEM FOR A MOTOR VEHICLE

(71) Applicant: ZF CV Systems Europe BV, Brussels (BE)

(72) Inventor: Eugen Kloos, Viernheim (DE)

(73) Assignee: ZF CV Systems Europe BV, Brussels (BE)

(*) Notice: Subject to any disclaimer, the term of this patent is extended or adjusted under 35 U.S.C. 154(b) by 227 days.

(21) Appl. No.: 17/427,692

(22) PCT Filed: Feb. 4, 2020

(86) PCT No.: PCT/EP2020/052712
§ 371 (c)(1),
(2) Date: Aug. 2, 2021

(87) PCT Pub. No.: WO2020/164963
PCT Pub. Date: Aug. 20, 2020

(65) Prior Publication Data
US 2022/0126805 A1    Apr. 28, 2022

(30) Foreign Application Priority Data
Feb. 13, 2019   (DE) .................... 10 2019 103 661.5

(51) Int. Cl.
*B60T 13/36*   (2006.01)
*B60T 13/26*   (2006.01)
(Continued)

(52) U.S. Cl.
CPC ............ *B60T 13/36* (2013.01); *B60T 13/268* (2013.01); *B60T 13/38* (2013.01); *B60T 15/52* (2013.01); *B60T 17/083* (2013.01)

(58) Field of Classification Search
CPC .......... B60T 8/327; B60T 13/36; B60T 13/38; B60T 13/261; B60T 13/263;
(Continued)

(56) References Cited

U.S. PATENT DOCUMENTS 3,999,075 A * 12/1976 Johnson ................ B60T 13/581
                                                                303/14
8,833,868 B2 *  9/2014 Bensch ................ B60T 13/385
                                                                303/113.1
(Continued)

FOREIGN PATENT DOCUMENTS

DE         10055108 A1    5/2002
DE     102013000275 A1    7/2014
(Continued)

OTHER PUBLICATIONS

European Patent Office, Rijswijk, Netherlands, International Search Report of International Application No. PCT/EP2020/052712, dated May 19, 2020, 2 pages.

*Primary Examiner* — Robert A. Siconolfi
*Assistant Examiner* — San M Aung
(74) *Attorney, Agent, or Firm* — Dickinson Wright PLLC

(57) ABSTRACT

A compressed-air braking system (DBA*) for a motor vehicle, includes a compressed-air supply device (1) with a compressor (2) and several brake circuits which are connected to the compressed-air supply device (1) via a multi-circuit protection valve (7) and include at least one parking brake circuit with parking brake cylinders (25.1, 25.2). In order to reduce the operating noise of the compressed-air braking system (DBA*) occurring in particular on venting of the parking brake cylinders (25.1, 25.2), it is provided that the parking brake cylinders (25.1, 25.2) can be vented, per wheel or per vehicle axle, alternately either to the surrounding atmosphere or into an additional reservoir (31) via a
(Continued)

respective quick-venting valve (29) connected to a connecting line (28) and a changeover valve (30) arranged downstream thereof.

18 Claims, 6 Drawing Sheets

(51) Int. Cl.
    *B60T 13/38*     (2006.01)
    *B60T 15/52*     (2006.01)
    *B60T 17/08*     (2006.01)

(58) Field of Classification Search
    CPC .... B60T 13/268; B60T 13/385; B60T 13/662; B60T 13/683; B60T 15/041; B60T 15/52; B60T 15/54; B60T 17/008; B60T 17/043; B60T 17/083; B60T 2270/413
    USPC .......................................................... 303/14
    See application file for complete search history.

(56) References Cited

U.S. PATENT DOCUMENTS

| | | | | |
|---|---|---|---|---|
| 2011/0144855 A1* | 6/2011 | Herges | ............... | B60T 8/327 |
| | | | | 701/29.1 |
| 2016/0281746 A1* | 9/2016 | Carez | ............... | F15B 11/06 |
| 2019/0308599 A1* | 10/2019 | Schmidt | ............... | B60T 15/027 |

FOREIGN PATENT DOCUMENTS

| | | | | |
|---|---|---|---|---|
| DE | 102013106260 A1 | 12/2014 | | |
| DE | 102015102127 A1 | 8/2016 | | |
| DE | 102016124253 A1 | 6/2018 | | |
| EP | 2754594 A1 * | 7/2014 | ........... | B60T 13/263 |
| GB | 1416204 A | 12/1975 | | |
| WO | 2016026577 A1 | 2/2016 | | |
| WO | 2016128417 A1 | 8/2016 | | |

* cited by examiner

COMPRESSED-AIR BRAKING SYSTEM FOR A MOTOR VEHICLE

TECHNICAL FIELD

The invention concerns a compressed-air braking system for a motor vehicle, which comprises a compressed-air supply device with a compressor and several brake circuits which are connected to the compressed-air supply device via a multi-circuit protection valve and include at least one parking brake circuit with parking brake cylinders.

BACKGROUND

The increasing conversion of vehicle drive systems from internal combustion engines to hybrid and electric drives places increasing focus on the operating noise of ancillaries and system devices, because these noises are perceived as unpleasant and disruptive both by vehicle occupants and by external passers-by. In a compressed-air braking system of a motor vehicle, as well as the operating noise of the compressor, the noise occurring during the discharge of compressed air from the brake cylinders is a relevant source of noise.

Whereas in normal driving mode, i.e. in normal operation of the tractor vehicle brake valve for braking the motor vehicle, the service brake cylinders of the service brake circuits are filled to a relatively low pressure of $1.5\times10^5$ Pa, in the parking brake cylinders of the parking brake circuit regularly a peak pressure of $7\times10^5$ Pa to $8.5\times10^5$ Pa occurs on release of the parking brake.

If brake cylinders are filled to a pressure of more than $1.9\times10^5$ Pa and then vented to atmosphere, in the narrowest cross-section of the flow channel, the flow reaches the speed of sound, which is associated with a comparatively loud noise on a direct discharge of the compressed air to the environment. Because of the low operating pressure, the noise occurring on release of the service brakes, i.e. on venting of the service brake cylinders of the service brake circuit, is relatively quiet and also usually occurs during travel. In contrast, on actuation of the parking brake, i.e. on venting of the parking brake cylinders of the parking brake circuit, the whooshing noise occurring is considerably louder because of the significantly higher pressure level and also occurs only while the vehicle is stationary. Vehicle manufacturers and their customers therefore have a very great interest in reducing the operating noise occurring during actuation of the parking brake from venting of the parking brake cylinders.

In the car sector, air suspension systems with a closed compressed air circuit are known. In these air suspension systems, the air springs are not vented to the environment but into a storage tank or an additional reservoir which can be connected to an intake chamber or intake tank of the compressor. Such air suspension systems are mainly used for energy saving, because the compressor is thereby operated less often and for shorter times, since the compressed air present under a residual pressure in the tank concerned is used to fill the air springs or as intake air of the compressor. As a side effect, the closed compressed air circuit also ensures a relatively low operating noise of these air suspension systems. Corresponding air suspension systems are described for example in DE 100 55 108 A1 and DE 10 2016 124 253 A1.

SUMMARY

Since such a closed compressed air circuit cannot simply be transferred to a compressed-air braking system of a utility vehicle with at least two service brake circuits, a parking brake circuit and a secondary consumer circuit, the present invention is based on the object of reducing the above-mentioned operating noise in a compressed-air braking system for a motor vehicle of the type cited initially.

This object is achieved by a compressed-air braking system with the features of claim 1. Advantageous embodiments and refinements of this compressed-air braking system are defined in the dependent claims.

The invention accordingly concerns a compressed-air braking system for a motor vehicle, which comprises a compressed-air supply device with a compressor and several brake circuits which are connected to the compressed-air supply device via a multi-circuit protection valve and include at least one parking brake circuit with parking brake cylinders. According to the invention, in this compressed-air braking system, it is provided that the parking brake cylinders can be vented, per wheel or per vehicle axle, alternately either to the surrounding atmosphere or into an additional reservoir via a respective quick-venting valve connected to a connecting line and a changeover valve arranged downstream thereof.

Because of the wheel-specific or axle-specific vent path of the parking brake cylinders concerned into the environment or into an additional reservoir via a quick-venting valve and a changeover valve, it is possible to vent the parking brake cylinders alternately directly to the environment in the case of a low operating pressure or internally into the additional reservoir in the case of a high operating pressure. In both cases, the parking brake cylinders are vented with a low noise level. Thus with little additional cost—which comprises a quick-venting valve and a changeover valve, and a respective separate or common reservoir, for each vehicle axle equipped with parking brake cylinders—it is possible to significantly reduce the operating noise of the compressed-air braking system on actuation of the parking brakes.

The axle-specific variant—in comparison with the wheel-specific variant—may be regarded as more advantageous since the axle-specific variant requires only one quick-venting valve and only one changeover valve for all parking brake cylinders arranged on a vehicle axle. This allows a saving in manufacturing and assembly costs.

Quick-venting valves are known in themselves, for example from DE 10 2015 102 127 A1, and are used for rapid release of the service brakes in motor vehicles with long brake lines and large-volume service brake cylinders.

For the compressed-air braking system according to the invention, a quick-venting valve is proposed which has an input port, a working port and an output port, wherein the input port is connected via a pressure line to the output port of a relay valve which can be controlled by a handbrake valve, wherein the working port is connected via the connecting line to the parking brake cylinders, and wherein the output port is connected via an output line to an input port of the changeover valve. In the quick-venting valve, the working port is connected to the input port in the case of a high pressure in the input-side pressure line, and to the output port in the case of a low pressure in the input-side pressure line or a pressureless pressure line.

The changeover valve may be configured as a 3/2-way directional solenoid valve and hence may be actively controllable, but disadvantageously this would require at least one pressure sensor connected to the connecting line in order to be able to switch the changeover valve depending on the actuating pressure present in the parking brake cylinders.

Also, an electronic control unit would be required to analyze the sensor signal of the pressure sensor and actuate the changeover valve.

Therefore, according to a refinement of the compressed-air braking system, it is provided that the changeover valve is configured as a pressure-controlled 3/2-way directional valve with a control pressure input, an input port and two output ports, the input port of which in unactuated rest state is connected to the first output port and in the switched state to the second output port. In this changeover valve, also the control pressure input is connected to the input port, the first output port leads to the surrounding atmosphere, and the second output port is connected to the reservoir. The changeover valve is thus autonomously active, wherein the changeover valve switches depending on the pressure active in the assigned parking brake cylinders, which pressure is present also at the control input of the changeover valve via the connecting line and the quick-venting valve.

In order to ensure a reduction in operating noise on discharge of compressed air, a spring stiffness and/or a set preload of a valve spring of the changeover valve is/are such that the input port is connected to the first output port below a predefined changeover pressure present at the control pressure input, and to the second output port on reaching or exceeding of the changeover pressure.

The changeover pressure of the changeover valve is set to a value above which the outflowing compressed air in the narrowest cross-section of the air outlet of the parking brake cylinders reaches the speed of sound. This value of changeover pressure may lie for example in the range between $1.9 \times 10^5$ Pa and $2.5 \times 10^5$ Pa inclusive of range limits. In the known parking brake cylinders, the narrowest cross-section of the air outlet is situated directly at the outer edge of the air outlet, so that when the critical pressure value is reached or exceeded on discharge of compressed air to the environment, a maximum noise level is achieved.

In order to achieve a low noise level also on the discharge of compressed air to the environment via the changeover valve, the narrowest cross-section of the air outlet at the first output port of the changeover valve is larger by a factor of 1.1 to 2.5 than the narrowest cross-section of the air outlet of the parking brake cylinder.

For the possible use of the compressed air which is discharged to the additional reservoir, the reservoir is connected via a connecting line to an intake tank of the compressor. Also, for security against the outflow of compressed air to the environment, preferably a check valve which blocks in the direction of the surrounding atmosphere is arranged in a suction line connecting the intake tank to the environment. This arrangement ensures that, when the reservoir is empty, the compressor draws in air from the environment via the suction line, and when the reservoir is full, it draws in compressed air under a residual pressure from the reservoir via the connecting line. Tests have shown that the intake of compressed air from the reservoir may reduce the energy consumption of the compressor by up to 13%.

Finally, it may be provided that the parking brake cylinders connected to a quick-venting valve and a changeover valve in the described arrangement are arranged on a trailerless motor vehicle and/or on its trailer vehicle or on the rear part of an articulated bus.

The invention is now explained in more detail below with reference to an exemplary embodiment shown in the appended drawings.

DETAILED DESCRIPTION OF THE DRAWINGS

Figure 5:
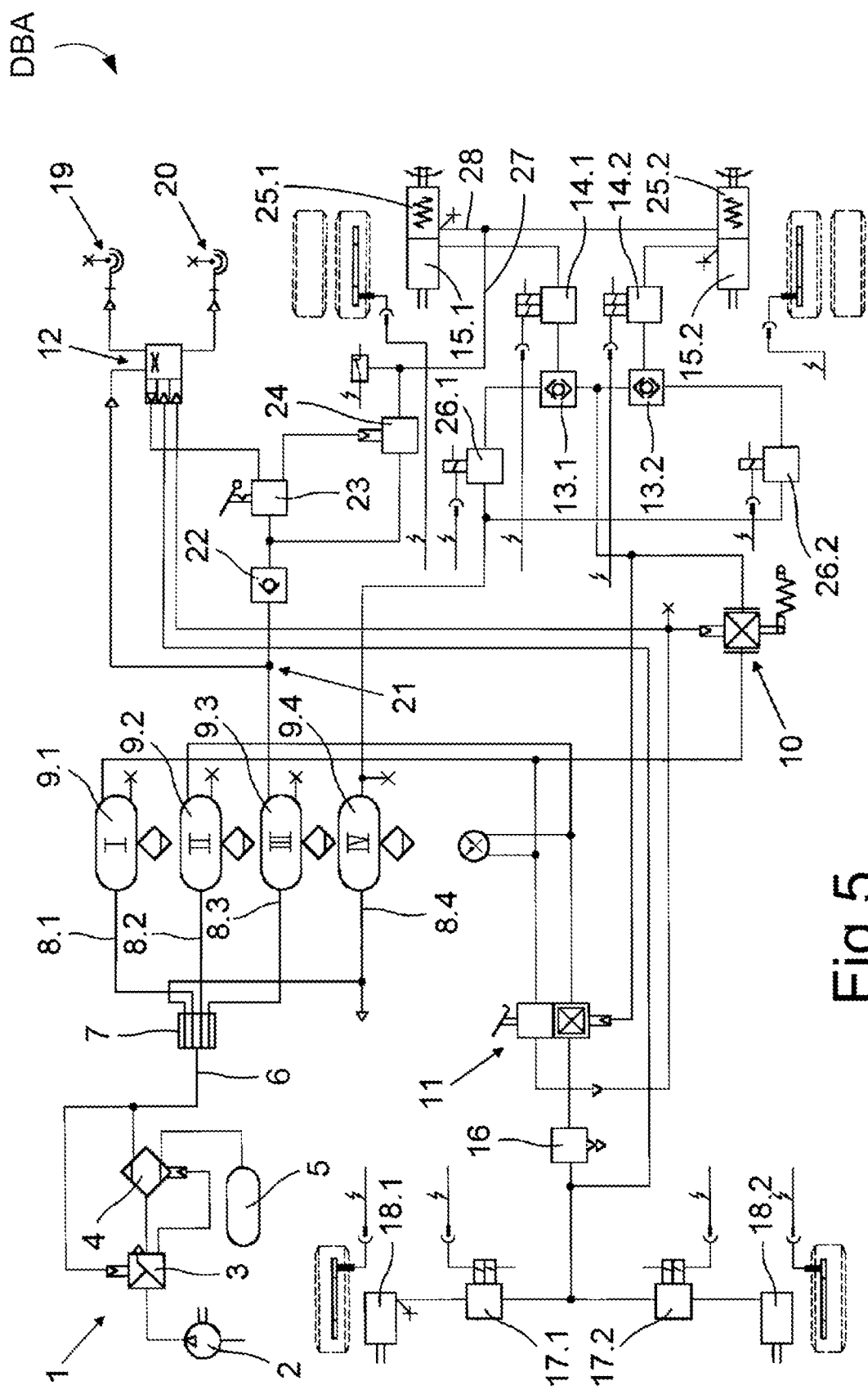
FIG. 5 shows a known compressed-air braking system in a schematic general depiction, with reference to which the invention is explained as an example.

The invention is described as an example below with reference to a compressed-air braking system DBA of a tractor vehicle, known from DE 10 2013 000 275 A1, which is illustrated in FIG. 5 in a schematic general depiction.

The compressed-air braking system DBA has a compressed-air supply device 1 and several brake circuits connected to the compressed-air supply device 1 via a multi-circuit protection valve 7. The compressed-air supply device 1 comprises a compressor 2, a pressure regulator 3, a dryer 4 and a storage tank 5. The compressor 2 can be driven by a drive motor (not shown) of the tractor vehicle, and in the engaged or coupled state conveys compressed air from the environment via the pressure regulator 3 and the dryer 4 to a pressure line 6. The storage tank 5 is also connected to the dryer 4 and may store compressed air for any required regeneration of the dryer 4. Four brake circuits are each connected by a respective storage line 8.1, 8.2, 8.3, 8.4 to the pressure line 6 of the compressed-air supply device 1 via a multi-circuit protection valve 7, which in this case is configured as a four-circuit protection valve. These circuits are two non-pressure-limited service brake circuits, a pressure-limited trailer control and parking brake circuit, and a pressure-limited service brake and auxiliary consumer circuit.

The storage line 8.1 of the first service brake circuit leads via a storage tank 9.1 to an ALB regulator 10 (ALB—automatic load-dependent brake) and to a tractor vehicle brake valve 11, from which a control pressure is conducted to the ALB regulator 10 and to a trailer control valve 12. From the ALB regulator 10, the compressed air is conducted via two 2-way valves 13.1, 13.2, and via two ABS solenoid valves 14.1, 14.2 (ABS=anti-lock braking system) to the service brake cylinders 15.1, 15.2 of the wheel brakes on the rear axle of the tractor vehicle. A control pressure picked up between the ALB regulator 10 and the two 2-way valves 13.1, 13.2 is conducted via a control line to a control pressure input of the tractor vehicle brake valve 11.

The storage line 8.2 of the second service brake circuit leads via a storage tank 9.2 to the tractor vehicle brake valve 11 and from there, via a quick-venting valve 16 and two ABS solenoid valves 17.1, 17.2, to the service brake cylinders 18.1, 18.2 of the wheel brakes on the front axle of the tractor vehicle. A control pressure picked up between the quick-venting valve 16 and the two ABS solenoid valves 17.1, 17.2 is conducted via a control line to a control pressure input of the trailer control valve 12.

The storage line 8.3 of the trailer control and parking brake circuit leads, via a storage tank 9.3 and the trailer control valve 12, to a "storage" coupling head 19, which serves to connect the storage line of the compressed-air braking system of a trailer. From the trailer control valve 12, a control line also leads to a "braking" coupling head 20 which serves to connect the brake control line of the trailer's compressed-air braking system. The storage line 8.3 has a branch 21 between the storage tank 9.3 and the trailer control valve 12, which branch leads via a check valve 22 to a handbrake valve 23 and a relay valve 24. From the handbrake valve 23, which serves for manual actuation of the parking brake, one control line leads to the trailer control valve 12 and one control line leads to the relay valve 24. When the handbrake valve 23 is actuated, compressed air is conducted from the storage line 8.3 through the relay valve 24, via a pressure line 27 and a connecting line 28, to the parking brake cylinders 25.1, 25.2 of the wheel brakes on the rear axle of the tractor vehicle, whereby the parking brake engaged by spring accumulators is released.

The storage line 8.4 of the service brake and auxiliary consumer circuit leads firstly via a storage tank 9.4 and two ASR brake valves 26.1, 26.2 (ASR=traction control), the two 2-way valves 13.1, 13.2 and the two ABS solenoid valves 14.1, 14.2, to the service brake cylinders 15.1, 15.2 of the wheel brakes on the rear axle of the tractor vehicle. Secondly, the storage line 8.4 of the service brake and auxiliary consumer circuit leads to auxiliary consumers which are not shown in detail.

Figure 1:
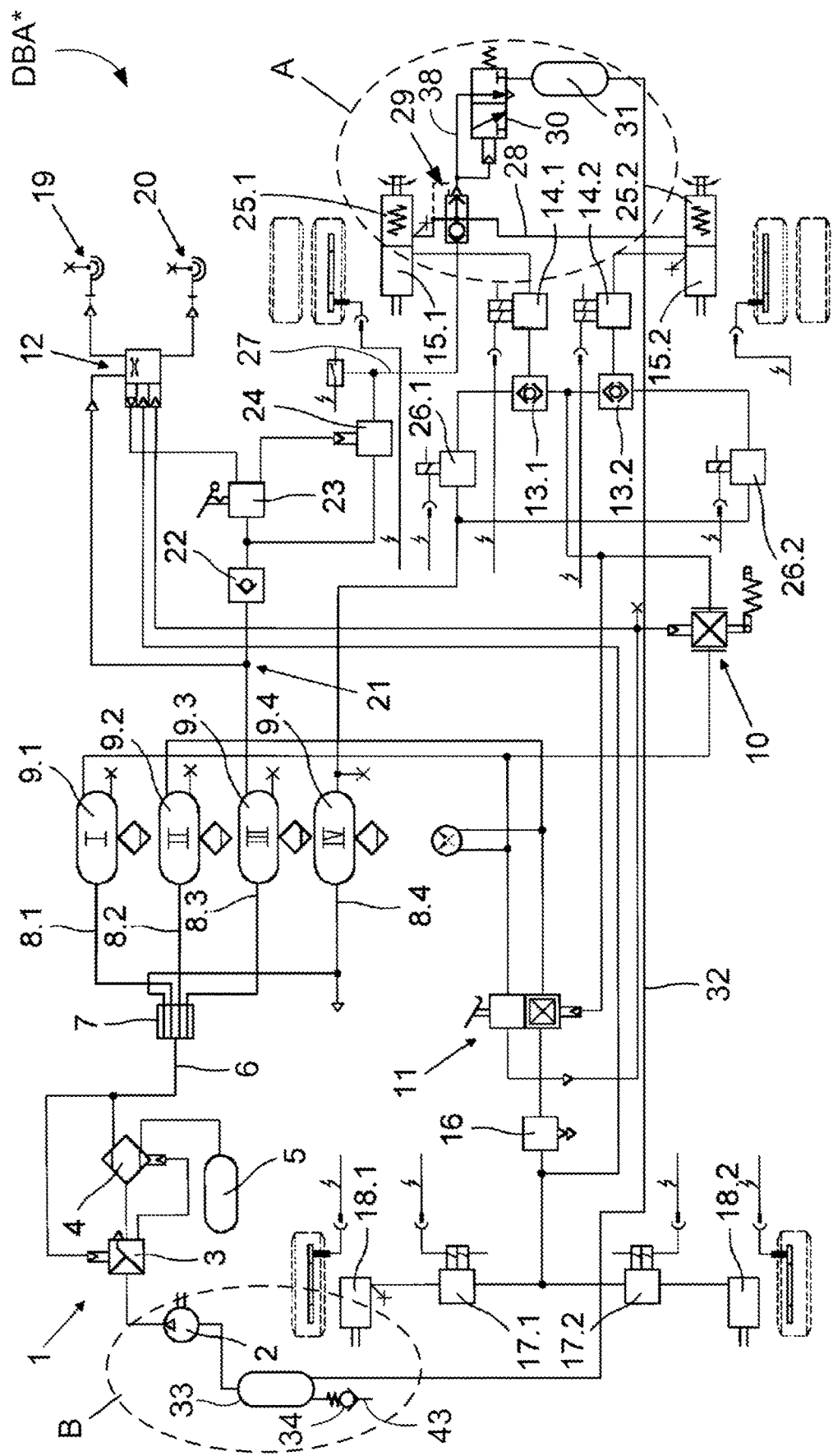
FIG. 1 shows a compressed-air braking system according to the invention in a schematic general depiction.

The schematic general depiction of FIG. 1 shows a compressed-air braking system DBA* according to the invention, which is formed by an extension of the known compressed-air braking system DBA from FIG. 5 with some components. As shown in FIG. 1 in the region of the rear axle, and in the extract A from FIG. 1 shown enlarged in FIG. 1a, now additionally a quick-venting valve 29, a changeover valve 30 and an additional reservoir 31 are assigned to the parking brake circuit.

Figure 1A:
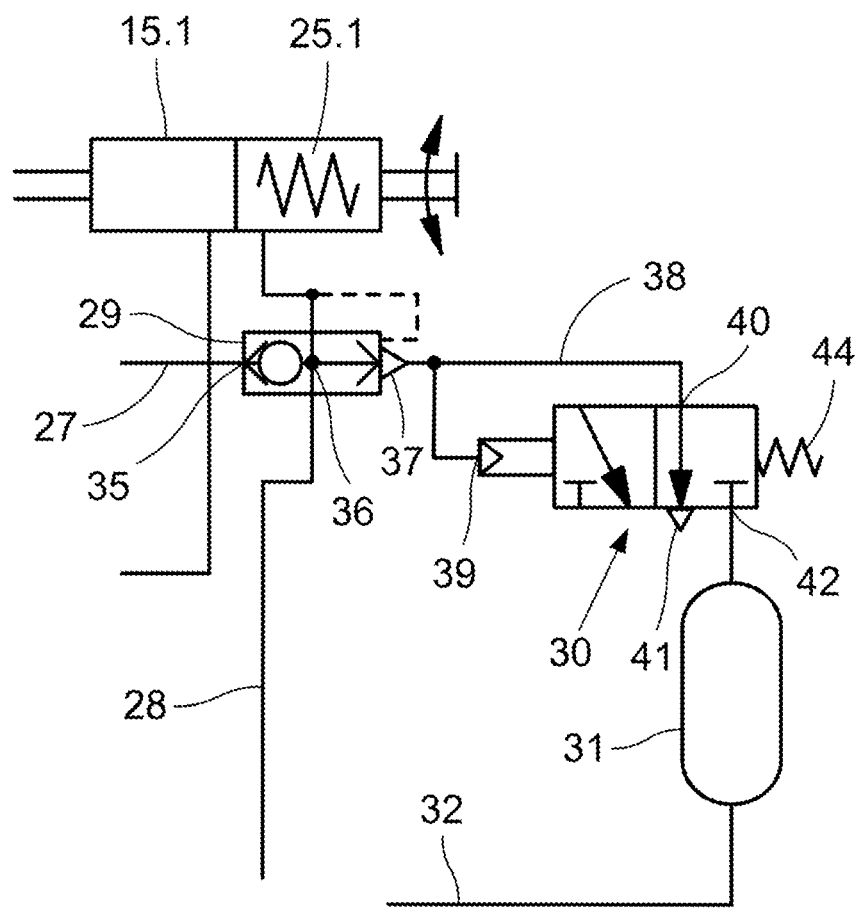
FIG. 1*a* shows a first enlarged extract A from FIG. 1 in a schematic depiction.

As FIG. 1a illustrates, the quick-venting valve 29 has an input port 35, a working port 36 and an output port 37. The input port 35 is connected via the pressure line 27 to the output port of the relay valve 24 which can be actuated by the handbrake valve 23. The working port 36 is connected to the parking brake cylinders 25.1, 25.2 via said connecting line 28. The output port 37 is connected to an input port 40 of the changeover valve 30 via an output line 38. In the quick-venting valve 29, in the case of high pressure in the input-side pressure line 27, the working port 36 is connected to the input port 36, and in the case of low pressure in the input-side pressure line 27 or a pressureless pressure line 27, it is connected to the output port 37.

The changeover valve 30 is a pressure-controlled 3/2-way directional switching valve with a control pressure input 39, an input port 40 and two output ports 41, 42. In its unactuated rest state shown, the input port 40 of the changeover valve 30 is connected to the first output port 41; in the switched state, it is connected to the second output port 42. The control pressure input 39 is connected to the input port 40. The first output port 41 leads to the surrounding atmosphere, and the second output port 42 is connected to the reservoir 31. A spring stiffness and/or a set preload of a valve spring 44 of the changeover valve 30 is such that the input port 40 is connected to the first output port 41 below a predefined changeover pressure $p_S$ present at the control pressure input 39, and to the second output port 42 on reaching or exceeding of the changeover pressure $p_S$. The changeover pressure $p_S$ of the changeover valve 30 is set to a value in the range between $1.9 \times 10^5$ Pa and $2.5 \times 10^5$ Pa inclusive of range limits, above which the outflowing compressed air in the narrowest cross-section of the air outlet of the parking brake cylinders 25.1, 25.2 reaches the speed of sound.

The described arrangement of the quick-venting valve 29, changeover valve 30 and reservoir 31 ensures that, in the case of a reduced pressure or pressureless pressure line 27, the parking brake cylinders 25.1, 25.2 of the parking brake on the rear axle of the tractor vehicle are vented via the quick-venting valve 29 and changeover valve 30 to the surrounding atmosphere below the changeover pressure $p_S$ in the parking brake cylinders 25.1, 25.2, and internally into the reservoir 31 on reaching or exceeding of the changeover pressure $p_S$ in the parking brake cylinders 25.1, 25.2. In this way, the noise level on discharge of compressed air from the parking brake cylinders 25.1, 25.2 is significantly reduced, so that the whooshing noise concerned is lost in the ambient noise and is no longer perceived as disruptive.

Figure 1B:
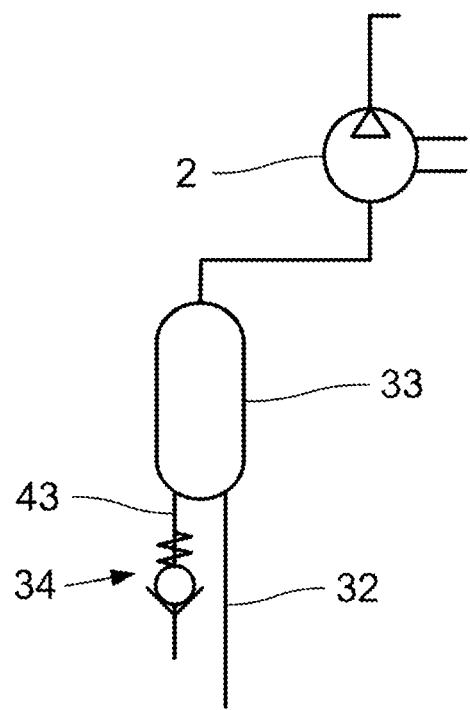
FIG. 1*b* shows a second enlarged extract B from FIG. 1 in a schematic depiction.

As can be seen in FIG. 1 in the region of the compressed-air supply device 1 and in the enlarged extract B from FIG. 1 shown in FIG. 1b, an intake tank 33 is assigned to the compressor 2 via a connecting line, and is connected on one side via a connecting line 32 to the rear axle reservoir 31 and on the other side via a suction line 43 to environment. For security against outflow of compressed air to the environment, a check valve 34 which blocks in the direction of the surrounding atmosphere is arranged in the suction line 43. This arrangement ensures that when the rear axle reservoir 31 is empty, the compressor 2 draws in air from the environment via the suction line 43, and when the rear axle reservoir 31 is filled, it draws in compressed air under residual pressure from this reservoir 31 via the connecting line 32. The intake of compressed air from the rear axle reservoir 31 allows a reduction of up to 13% in the energy consumption of the compressor 2.

A compressed-air braking system DBA* having the features of the invention would have a slightly more complex structure if, in contrast to FIG. 1, it had a quick-venting valve 29 and a changeover valve 30 for each parking brake cylinder 25.1, 25.2. It would however function similarly.

The function method of the compressed-air braking system DBA* from FIG. 1 on discharge of compressed air from the parking brake cylinders 25.1, 25.2 is now explained below with reference to three time diagrams shown in FIGS. 2 to 4, the curves of which were determined by a numerical simulation.

Figure 2:
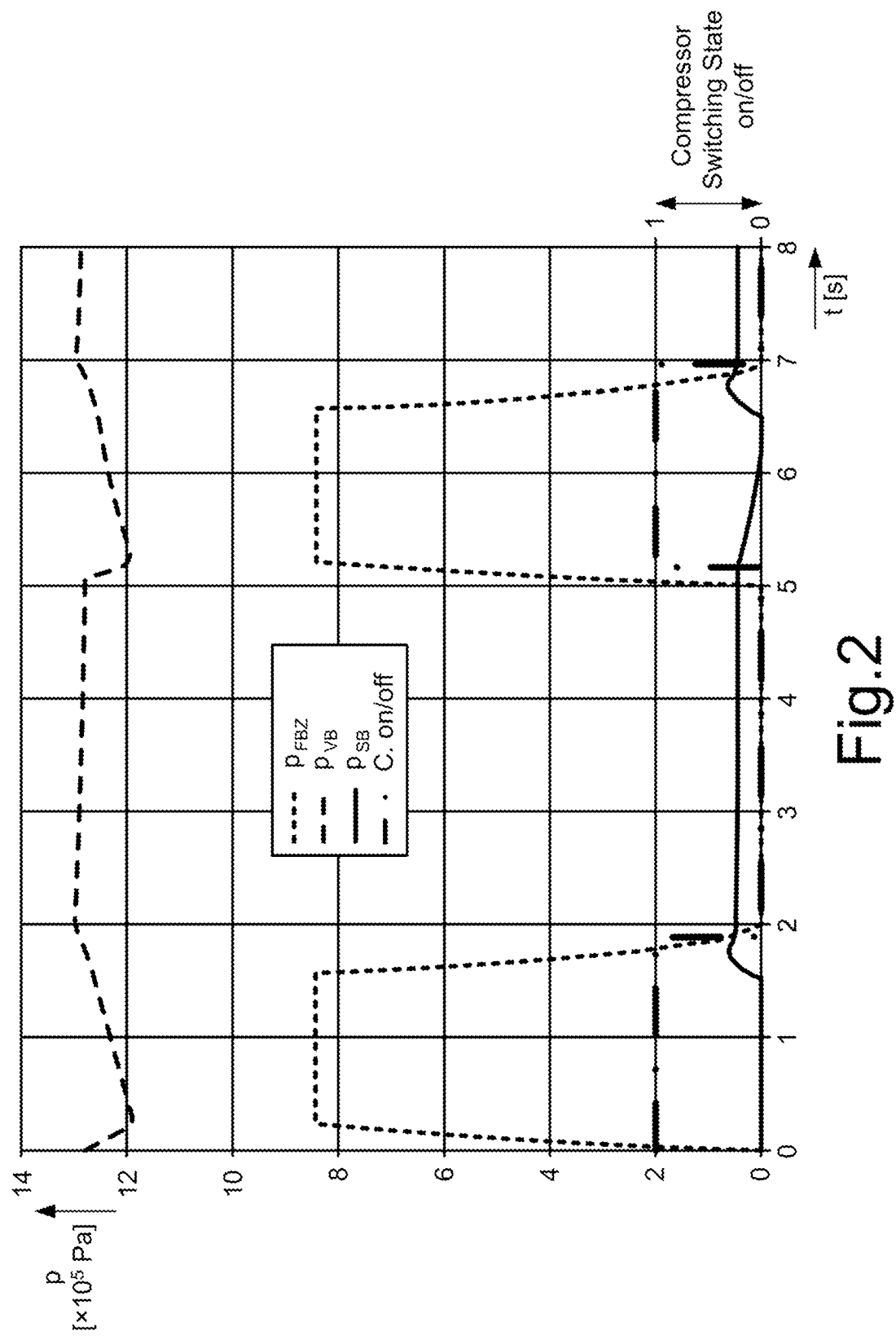
FIG. 2 shows a time diagram of pressure curves of parking brake cylinders and pressure vessels of the compressed-air braking system from FIG. 1, and the operating state of a compressor.

The diagram in FIG. 2 shows the time curves of the pressure $p_{FBZ}$ in the parking brake cylinders 25.1, 25.2, the pressure $p_{VB}$ in the assigned storage tank 9.3, the pressure $p_{SB}$ in the additional rear axle reservoir 31, and the switching state K of the compressor 2 (0=compressor switched off, 1=compressor switched on) over a time period from t=0 s to t=8 s.

In a first sequence in time portion t=0 s to around t=2 s, the rear axle reservoir 31 is empty, i.e. the pressure $p_{SB}$ in the rear axle reservoir 31 is 0 Pa. Actuation of the handbrake valve 23 to release the parking brake at time t=0 fills the parking brake cylinders 25.1, 25.2, so that the pressure $p_{FBZ}$ rises to around $8.5 \times 10^5$ Pa. At the same time, the pressure $p_{VB}$ in the storage tank 9.3 falls below a switch-on pressure, so that the compressor 2 is switched on and draws in air from the environment via the suction line 43 (switching state of compressor=1). As a result, the pressure $p_{VB}$ in the storage tank 9.3 rises as the time goes on.

At a time of around t=1.6 s, the handbrake valve 23 is again actuated to engage the parking brake, whereby compressed air is discharged from the parking brake cylinders 25.1, 25.2. Since the pressure $p_{FBZ}$ in the parking brake cylinders 25.1, 25.2 at $8.5 \times 10^5$ Pa lies significantly above the changeover pressure $p_S$ of the changeover valve 30, the changeover valve 30 is switched and compressed air flows from the parking brake cylinders 25.1, 25.2 via the quick-venting valve 29 and changeover valve 30 into the rear axle reservoir 31, whereby the pressure $p_{SB}$ in the reservoir 31 rises to around $0.45 \times 10^5$ Pa. On reaching the switch-off pressure, because of the pressure $p_{VB}$ in the storage tank 9.3 at the time around t=1.85 s, the compressor 2 is switched off again (compressor switching state=0).

In a second sequence in time portion t=5 s to t=7 s, firstly at time t=5 s the handbrake valve 23 is actuated to release the parking brake, whereby the parking brake cylinders 25.1, 25.2 are filled and the pressure $p_{FBZ}$ rises to around $8.5 \times 10^5$ Pa. This reduces the pressure $p_{VB}$ in the storage tank 9.3 below the switch-on pressure, so that the compressor 2 is switched on at the time around t=5.2 s (compressor switching state=1). The compressor 2 initially draws in air under a residual pressure of $0.45 \times 10^5$ Pa from the rear axle reservoir 31 until this is empty at the time around t=6.5 s. From this time, the compressor 2 draws in air from the environment via the suction line 43. Because of operation of the compressor 2, the pressure $p_{VB}$ in the storage container 9.3 rises further.

At the time around t=6.7 s, the handbrake valve 23 is again actuated to engage the parking brake, whereby the compressed air is discharged from the parking brake cylinders 25.1, 25.2. Since the pressure $p_{FBZ}$ in the parking brake cylinders 25.1, 25.2 at $8.5 \times 10^5$ Pa lies significantly above the changeover pressure $p_S$ of the changeover valve 30, the changeover valve 30 is switched and compressed air flows from the parking brake cylinders 25.1, 25.2 via the quick-venting valve 29 and changeover valve 30 into the rear axle reservoir 31, whereby the pressure $p_{SB}$ in the reservoir 31 rises to around $0.45 \times 10^5$ Pa. When the pressure $p_{VB}$ in the storage tank 9.3 reaches the switch-off pressure at the time around t=6.95 s, the compressor 2 is switched off again (compressor switching state=1).

Figure 3:
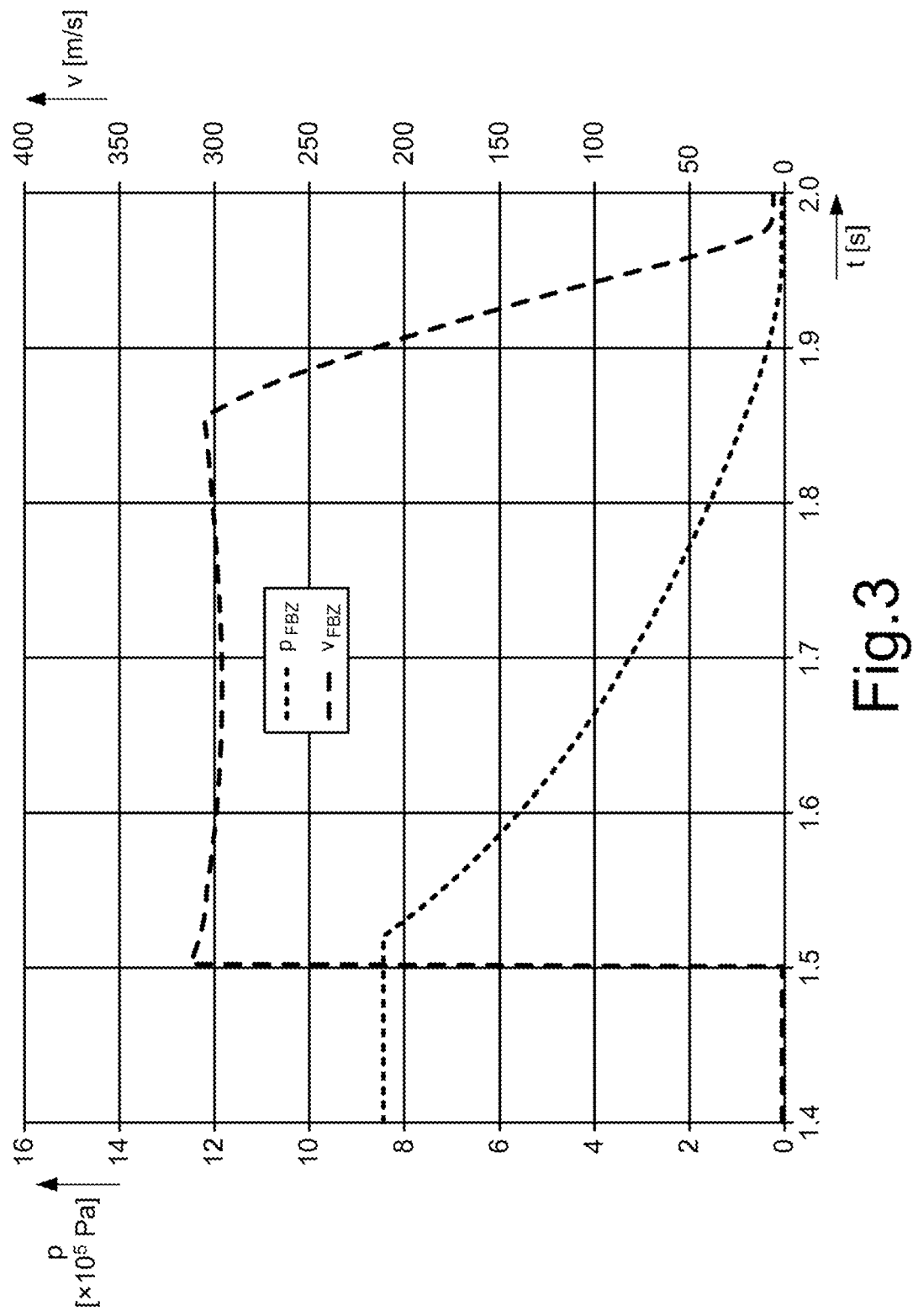
FIG. 3 shows a time diagram of a pressure curve of parking brake cylinders and a flow speed curve at the air outlet of the parking brake cylinders of the compressed-air braking system from FIG. 1.

The diagram in FIG. 3 shows the time curves of the pressure $p_{FBZ}$ in the parking brake cylinders 25.1, 25.2 and the flow speed $v_{FBZ}$ at the air outlet of the parking brake cylinders 25.1, 25.2 over a time period from t=1.4 s to t=2.0 s.

Initially, the parking brake is released by activation of the spring accumulator brake cylinders 25.1, 25.2, and the spring accumulator brake cylinders 25.1, 25.2 are under a pressure of $p_{FBZ}$=$8.5 \times 10^5$ Pa. At time t=1.5 s, the handbrake valve 23 is actuated to engage the parking brake, whereby the spring accumulator brake cylinders 25.1, 25.2 are vented and the pressure $p_{FBZ}$ in the spring accumulator brake cylinders 25.1, 25.2 falls. Because of the initially high pressure $p_{FBZ}$, in the narrowest cross-section at the air outlet of the parking brake cylinders 25.1, 25.2, the outflowing compressed air initially reaches the speed of sound at approximately $v_{FBZ}$=300 m/s, which leads to loud and unpleasant noises on a direct discharge of air to the environment. Only when the pressure $p_{FBZ}$ in the spring accumulator brake cylinders 25.1, 25.2 falls from the time around t=1.86 s, does the flow speed $v_{FBZ}$ of the outflowing compressed air also fall.

Figure 4:
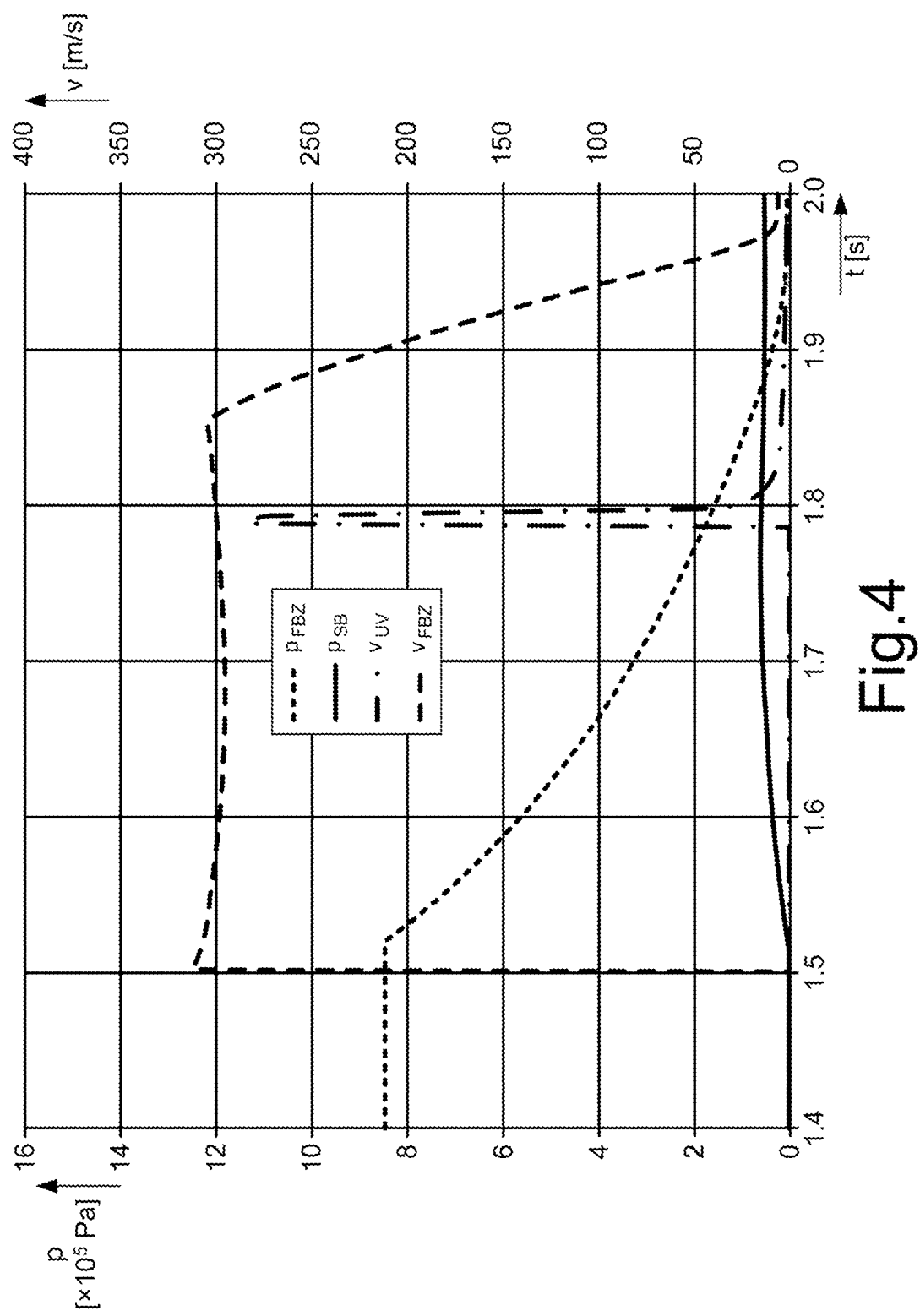
FIG. 4 shows a time diagram of pressure curves of parking brake cylinders and a pressure vessel, and flow speed curves at the air outlet of the parking brake cylinders and a changeover valve of the compressed-air braking system from FIG. 1.

In addition to the time curves of the pressure $p_{FBZ}$ in the parking brake cylinders 25.1, 25.2 and the flow speed $v_{FBZ}$ at the air outlet of the parking brake cylinders 25.1, 25.2, the diagram of FIG. 4, in contrast to the diagram of FIG. 3, also shows the time curves of the pressure $p_{SB}$ in the additional rear axle reservoir 31 and the flow speed $v_{UV}$ at the first output port 41 of the changeover valve 30 over a time period from t=1.5 to t=2.0 s.

As long as the pressure $p_{FBZ}$ in the parking brake cylinders 25.1, 25.2 lies above the changeover pressure $p_S$ of the changeover valve 30 on discharge of compressed air, the changeover valve 30 is switched and the compressed air from the parking brake cylinders 25.1, 25.2 flows via the quick-venting valve 29 and changeover valve 30 into the reservoir 31, so that the pressure $p_{SB}$ in the reservoir 31 rises to approximately $0.45 \times 10^5$ Pa. At the time around t=1.78 s, the pressure $p_{FBZ}$ in the parking brake cylinders 25.1, 25.2 has fallen below the changeover pressure $p_S$ of the changeover valve 30, so that the changeover valve 30 is switched to its rest position and the compressed air then escapes from the parking brake cylinders 25.1, 25.2 directly to the environment via the quick-venting valve 29 and the changeover valve 30. As the diagram in FIG. 4 shows, during the switching process of the changeover valve 30, at the first output port 41 which is larger than the narrowest cross-section of the air outlet of the parking brake cylinders 25.1, 25.2, the flow speed $v_{UV}$ briefly reaches the speed of sound. Because the compressed air which is initially under a higher pressure $p_{FBZ}$ flows into the rear axle reservoir 31, the noise level on venting of the parking brake cylinders 25.1, 25.2 is substantially reduced.

LIST OF REFERENCE SIGNS

1 Compressed-air supply device
2 Compressor
3 Pressure regulator
4 Dryer
5 Storage tank
6 Pressure line
7 Multi-circuit protection valve, four-circuit protection valve
8.1, 8.2 Storage line
8.3, 8.4 Storage line
9.1, 9.2 Storage container
9.3, 9.4 Storage container
10 ALB regulator (ALB=automatic load-dependent brake)
11 Tractor vehicle brake valve
12 Trailer control valve
13.1, 13.2 Two-way valve
14.1, 14.2 ABS solenoid valve
15.1, 15.2 Service brake cylinder
16 Quick-venting valve
17.1, 17.2 ABS solenoid valve
18.1, 18.2 Service brake cylinder
19 "Storage" coupling head
20 "Braking" coupling head
21 Branch
22 Check valve
23 Handbrake valve
24 Relay valve
25.1, 25.2 Parking brake cylinder
26.1, 26.2 ASR brake valve 27 Pressure line
28 Connecting line
29 Quick-venting valve
30 Changeover valve
31 Rear axle reservoir
32 Connecting line
33 Intake tank
34 Check valve
35 Input port
36 Working port
37 Output port
38 Output line
39 Control pressure input
40 Input port
41 First output port
42 Second output port
43 Suction line
44 Valve spring of changeover valve 30
A Extract from FIG. 1
B Extract from FIG. 1
p Pressure
$p_{FBZ}$ Pressure in parking brake cylinders (25.1, 25.2)
$p_{SB}$ Pressure in reservoir (31)
$p_S$ Changeover pressure of changeover valve (30)
$p_{VB}$ Pressure in storage tank (9.3)
t Time
v Flow speed
$v_{FBZ}$ Flow speed at air outlet of parking brake cylinder
$v_{UV}$ Flow speed at first output port of changeover valve

The invention claimed is:

1. A compressed-air braking system (DBA*) for a motor vehicle, the compressed-air braking system comprising:
a compressed-air supply device (1) with a compressor (2) and
several brake circuits which are connected to the compressed-air supply device (1) via a multi-circuit protection valve (7), and include at least one parking brake circuit with parking brake cylinders (25.1, 25.2),
wherein the parking brake cylinders (25.1, 25.2) are configured to be vented, per wheel or per vehicle axle, alternately either to the surrounding atmosphere or into a reservoir (31) via a respective quick-venting valve (29) connected to a connecting line (28) and a changeover valve (30) arranged downstream thereof in the at least one parking brake circuit.

2. The compressed-air braking system as claimed in claim 1, wherein the quick-venting valve (29) comprises an input port (35), a working port (36) and an output port (37),
wherein the input port (35) is connected via a pressure line (27) to the output port of a relay valve (24) controlled by a handbrake valve (23), wherein the working port (36) is connected via the connecting line (28) to the parking brake cylinders (25.1, 25.2), and wherein the output port (37) is connected via an output line (38) to an input port (40) of the changeover valve (30).

3. The compressed-air braking system (DBA*) for a motor vehicle, the compressed-air braking system comprising:
a compressed-air supply device (1) with a compressor (2) and
several brake circuits which are connected to the compressed-air supply device (1) via a multi-circuit protection valve (7), and include at least one parking brake circuit with parking brake cyliners (25.1, 25.2),
wherein the parking brake cylinders (25.1, 25.2) are configured to be vented, per wheel or per vehicle axle, alternately either to the surrounding atmosphere or into a reservoir (31) via a respective quick-venting valve (29) connected to a connecting line (28) and a changeover vale (30) arranged downstream thereof in the at least one parking brake circuit, and
wherein the changeover valve (30) is configured as a pressure-controlled 3/2-way directional valve with a control pressure input (39), an input port (40) and two output ports (41, 42), the 3/2-way directional valve having an unactuated rest state, in which the input port (40) is connected to the first output port (41), and a switched state, in which the input port (40) is connected to the second output port (42), wherein the control pressure input (39) is connected to the input port (40), the first output port (41) leads to the surrounding atmosphere, and the second output port (42) is connected to the reservoir (31).

4. The compressed-air braking system as claimed in claim 3, wherein the changeover valve (30) has a valve spring (44) with at least a spring stiffness or a set preload, dimensioned such that the input port (40) is connected to the first output port (41) below a predefined changeover pressure ($p_S$) present at the control pressure input (39), and to the second output port (42) on reaching or exceeding of the changeover pressure ($p_S$).

5. The compressed-air braking system as claimed in claim 4, wherein the changeover pressure ($p_S$) of the changeover valve (30) is set to a value above which outflowing compressed air in the narrowest cross-section of an air outlet of the parking brake cylinders (25.1, 25.2) reaches the speed of sound.

6. The compressed-air braking system as claimed in claim 5, wherein the changeover pressure ($p_S$) of the changeover valve (30) is set to a value in the range of $1.9 \times 10^5$ Pa through $2.5 \times 10^5$ Pa.

7. The compressed-air braking system as claimed in claim 4, wherein the narrowest cross-section of the air outlet at the first output port (41) of the changeover valve (30) is larger by a factor of 1.1 to 2.5 than the narrowest cross-section of an air outlet of an associated parking brake cylinder (25.1, 25.2).

8. The compressed-air braking system as claimed in claim 1, wherein the reservoir (31) is connected via a connecting line (32) to an intake tank (33) of the compressor (2), and wherein a check valve (34), which blocks an air flow into the surrounding atmosphere, is arranged in a suction line (43) connecting the intake tank (33) to the environment.

9. The compressed-air braking system as claimed in claim 1, wherein the parking brake cylinders (25.1, 25.2) connected to the quick-venting valve (29) and the changeover valve (30) are configured to be arranged on a trailerless motor vehicle, or on a trailer vehicle, or on a rear part of an articulated bus.

10. A compressed-air braking system (DBA*) for a motor vehicle, the compressed-air braking system comprising:
a compressed-air supply device (1) with a compressor (2) and
several brake circuits which are connected to the compressed-air supply device (1) via a multi-circuit protection valve (7), and include at least one parking brake circuit with parking brake cylinders (25.1, 25.2),
a quick-venting valve (29) connected to the parking brake cylinders (25.1, 25.2) and configured to vent the parking brake cylinders,
a changeover valve (30) downstream from the quick-venting valve (29) and connected to the quick-venting valve (29) via an output line (38) therefrom, a reservoir (31) downstream from the changeover valve (30), wherein the parking brake cylinders (25.1, 25.2) are configured to be vented, per wheel or per vehicle axle, to both the surrounding atmosphere and into the reservoir (31) via the changeover valve (30), wherein the parking brake cylinders (25.1, 25.2) vent to either the surrounding atmosphere or into the reservoir depending on a pressure level at the changeover valve (30).

11. The compressed-air braking system as claimed in claim 10, wherein the quick-venting valve (29) comprises an input port (35), a working port (36) and an output port (37), wherein the input port (35) is connected via a pressure line (27) to the output port of a relay valve (24) controlled by a handbrake valve (23), wherein the working port (36) is connected via a connecting line (28) to the parking brake cylinders (25.1, 25.2), and wherein the output port (37) is connected via the output line (38) to an input port (40) of the changeover valve (30).

12. The compressed-air braking system as claimed in claim 10, wherein the changeover valve (30) is configured as a pressure-controlled 3/2-way directional valve with a control pressure input (39), an input port (40) and two output ports (41, 42), the 3/2-way directional valve having an unactuated rest state, in which the input port (40) is connected to the first output port (41), and a switched state, in which the input port (40) is connected to the second output port (42), wherein the control pressure input (39) is connected to the input port (40), the first output port (41) leads to the surrounding atmosphere, and the second output port (42) is connected to the reservoir (31).

13. The compressed-air braking system as claimed in claim 12, wherein the changeover valve (30) has a valve spring (44) with at least a spring stiffness or a set preload, dimensioned such that the input port (40) is connected to the first output port (41) below a predefined changeover pressure ($p_S$) present at the control pressure input (39), and to the second output port (42) on reaching or exceeding of the changeover pressure ($p_S$).

14. The compressed-air braking system as claimed in claim 13, wherein the changeover pressure ($p_S$) of the changeover valve (30) is set to a value above which outflowing compressed air in the narrowest cross-section of an air outlet of the parking brake cylinders (25.1, 25.2) reaches the speed of sound.

15. The compressed-air braking system as claimed in claim 14, wherein the changeover pressure ($p_S$) of the changeover valve (30) is set to a value in the range of $1.9 \times 10^5$ Pa through $2.5 \times 10^5$ Pa.

16. The compressed-air braking system as claimed in claim 13, wherein the narrowest cross-section of the air outlet at the first outport port (41) of the changeover valve (30) is larger by a factor of 1.1 to 2.5 than the narrowest cross-section of an air outlet of an associated parking brake cylinders (25.1, 25.2).

17. The compressed-air braking system as claimed in claim 10, wherein the reservoir (31) is connected via a connecting line (32) to an intake tank (33) of the compressor (2), and wherein a check valve (34), which blocks an air flow into the surrounding atmosphere, is arranged in a suction line (43) connecting the intake tank (33) to the environment.

18. The compressed-air braking system as claimed in claim 10, wherein the parking brake cylinders (25.1, 25.2) connected to the quick-venting valve (29) and the changeover valve (30) are configured to be arranged on a trailerless motor vehicle, or on a trailer vehicle, or on a rear part of an articulated bus.

* * * * *